US006999892B2

(12) United States Patent
Mednikov et al.

(10) Patent No.: US 6,999,892 B2
(45) Date of Patent: Feb. 14, 2006

(54) CIRCUIT ARRANGEMENT AND METHOD FOR CONTROLLING AND EVALUATING SIGNAL DETECTORS

(75) Inventors: Felix Mednikov, Ortenburg (DE); Martin Sellen, Ortenburg (DE); Karl Wisspeintner, Ortenburg (DE)

(73) Assignee: Micro-Epsilon Messtechnik GmbH & Co. KG, Ortenburg (DE)

( * ) Notice: Subject to any disclaimer, the term of this patent is extended or adjusted under 35 U.S.C. 154(b) by 74 days.

(21) Appl. No.: 10/322,067

(22) Filed: Dec. 17, 2002

(65) Prior Publication Data

US 2003/0130814 A1 Jul. 10, 2003

Related U.S. Application Data

(63) Continuation of application No. PCT/DE01/03032, filed on Aug. 8, 2001.

(30) Foreign Application Priority Data

Aug. 23, 2000 (DE) ............................... 100 41 321
May 14, 2001 (DE) ............................... 101 23 303

(51) Int. Cl.
*G01K 1/00* (2006.01)
*G01K 11/00* (2006.01)

(52) U.S. Cl. ...................................................... 702/130

(58) Field of Classification Search .................. 702/99, 702/104, 130–136; 327/512, 513
See application file for complete search history.

(56) References Cited

U.S. PATENT DOCUMENTS

| | | | | |
|---|---|---|---|---|
| 3,656,344 A * | 4/1972 | Johns | ...................... | 73/152.12 |
| 3,895,292 A * | 7/1975 | Zair et al. | ................... | 324/704 |
| 3,950,991 A * | 4/1976 | Grass | ......................... | 374/114 |
| 4,143,549 A * | 3/1979 | Koehler | ...................... | 374/114 |
| 4,207,481 A * | 6/1980 | Dobkin | ....................... | 327/513 |
| 4,282,753 A * | 8/1981 | Davidson | .................... | 374/166 |
| 4,294,115 A * | 10/1981 | Labus | ........................ | 374/114 |
| 4,415,279 A * | 11/1983 | Beuse et al. | ................ | 374/204 |
| 4,538,466 A * | 9/1985 | Kerber | ........................ | 73/724 |
| 4,967,603 A * | 11/1990 | Krebs et al. | ............. | 73/861.02 |
| 5,332,966 A | 7/1994 | Berberich | | |
| 5,365,442 A * | 11/1994 | Schmidt | ...................... | 701/50 |
| 5,385,529 A * | 1/1995 | Koch | .......................... | 600/22 |
| 5,388,558 A * | 2/1995 | Plapp et al. | ................ | 123/520 |
| 5,389,225 A * | 2/1995 | Aagard et al. | .............. | 204/426 |
| 5,477,473 A | 12/1995 | Mandl et al. | | |
| 5,788,148 A * | 8/1998 | Burner et al. | ............... | 237/2 A |
| 5,881,208 A * | 3/1999 | Geyling et al. | ............. | 392/418 |
| 5,886,515 A * | 3/1999 | Kelly | ......................... | 323/313 |
| 5,914,593 A * | 6/1999 | Arms et al. | ............ | 324/207.12 |
| 5,967,659 A * | 10/1999 | Plotnikov et al. | ............. | 374/11 |

FOREIGN PATENT DOCUMENTS

| | | |
|---|---|---|
| DE | 39 10 597 A1 | 10/1990 |
| EP | 0 548 495 B1 | 6/1993 |
| FR | 2 685 474 A | 6/1993 |
| WO | WO 93/20409 A | 10/1993 |

* cited by examiner

*Primary Examiner*—Michael Nghiem
*Assistant Examiner*—Demetrius Pretlow
(74) *Attorney, Agent, or Firm*—Alston & Bird LLP

(57) ABSTRACT

A circuit arrangement (10) for activating a sensor and evaluating its signals, in particular for parametric sensors with complex impedances. The circuit arrangement comprises at least one sensor (2) for acquiring mechanical data. In order to minimize or largely prevent temperature caused disturbances in a constructionally simple layout, the measuring signal, the absolute temperature, and the gradient temperature of the sensor (2) are acquired simultaneously, preferably by means of a microprocessor or microcomputer (3). A corresponding method for activating sensors and evaluating their signals is also described.

27 Claims, 3 Drawing Sheets

CIRCUIT ARRANGEMENT AND METHOD FOR CONTROLLING AND EVALUATING SIGNAL DETECTORS

CROSS REFERENCE TO RELATED APPLICATION

This is a continuation of copending international application No. PCT/DE01/03032, filed 8 Aug. 2001 and designating the U.S.

BACKGROUND OF THE INVENTION

The invention relates to a circuit arrangement for activating sensors and evaluating their signals, in particular for parametric sensors with complex impedances, the circuit arrangement comprising at least one sensor for acquiring mechanical quantities. The invention further relates to a method for activating sensors and evaluating their signals, in particular parametric sensors with complex impedances, wherein at least one sensor acquires mechanical quantities.

Circuit arrangements for activating sensors and evaluating their signals have been known from practice for a long time. Known circuit arrangements for activating sensors and evaluating their signals with complex impedances, for example, differential and nondifferential, inductive or capacitive sensors, such as linear variable-differential transformers (LVDT), differential chokes, eddy current sensors, or the like, make use of a bridge circuit, in general an alternating-current bridge circuit, which is supplied by a sinusoidal oscillator. After amplification by an ac amplifier, the output voltage of the ac bridge circuit is rectified with a phase-sensitive demodulator, and after the required filtration, the thus-obtained dc voltage, which is approximately proportional to the measured quantity, is converted with an A/D converter into a corresponding digital signal.

Circuit arrangements of this type are problematic, in particular to the extent that they make great demands on all structural elements of the circuit arrangement. For example, the sinusoidal oscillator must exhibit a satisfactory stability in amplitude, frequency, and phase, the phase-sensitive demodulator a satisfactory linearity, and the circuit arrangement in general a very satisfactory temperature- and long-term stability. Furthermore, the very complicated layout of the circuit arrangement is a problem. These two aspects together are the reason for the often very high price of such a circuit arrangement, which remains high, even when the circuit arrangement is made as an integrated component in large quantities.

The known circuit arrangements are also problematic to the extent that the technical properties are often subjected to considerable limitations by the occurrence of phase shifts, phase rotations, and nonlinear distortions of the bridge output voltage, which often prevail as a result of the complex impedances of the sensor, and by the occurring nonlinearities of the unbalanced bridge circuit. Thus, for example, higher harmonics that are generated by nonlinear effects in the ferromagnetic circuit of the sensor, and the quadrature component limit the resolution of the entire arrangement.

DE 39 10 597 A1 discloses a circuit arrangement with a sensor and a method for activating sensors and evaluating their signals, wherein the sensor comprises a coil, and wherein the temperature-dependent inductance fluctuations of the coil undergo a compensation. In this arrangement, the ohmic resistor of the coil forms a temperature measuring sensor. The acquisition of the quantity being measured, for example, a distance, and the temperature proceeds in two separate circuits, which are controlled by a microcomputer. Consequently, the circuit arrangement disclosed in DE 39 10 597 A1 has all the above-described disadvantages.

It is therefore an object of the present invention to describe both a circuit arrangement and a method for activating sensors and evaluating their signals of the initially described type, which allow to minimize or largely prevent temperature-caused disturbances with a constructionally simple layout.

SUMMARY OF THE INVENTION

In accordance with the invention, the foregoing object is accomplished by a circuit arrangement for activating a sensor and evaluating its signals which is configured such that it permits acquiring the measuring signal, the absolute temperature and the gradient temperature of the sensor simultaneously, preferably by means of the microprocessor or microcomputer.

By way of the present invention, it has been recognized that deviating from the practice of the past, one must compensate not only the dependency of the sensor on the absolute temperature, but additionally and simultaneously the gradient temperature for purposes of attaining a satisfactory temperature, and long-term stability of the measuring signal. With that, it is possible to compensate additive and multiplicative temperature errors of the measuring signal. In a technical respect, this is accomplished in a particularly simple and sophisticated way in that these signals can be simultaneously acquired, preferably by means of a microprocessor or microcomputer. Temperature-caused disturbances can thus be compensated to a greatest extent. In addition, it is possible to realize in this manner a particularly simple structure of the circuit arrangement, which makes it especially easy to integrate the circuit arrangement and thus to use it universally, thereby making it possible to keep down the price of the circuit arrangement.

In a particularly advantageous manner, it is made possible to compensate the dependency of the measuring signal on the absolute temperature and the gradient temperature at the same time, preferably by means of the microprocessor or microcomputer. With that, the circuit arrangement is kept very simple, and would be especially well suited for activating and evaluating complex quarter-, half-, and/or full bridges.

The sensor could have at least one impedance. The complex and/or the ohmic input resistance of the sensor would then permit acquiring temperature-dependent changes of the impedance or impedances. In this connection, the dependency of the sensor on the temperature is given by the temperature-dependent fluctuations of the impedance or impedances.

In a further advantageous manner, it would be possible to generate at least two voltages by means of a source of voltage and/or at least one switch. The voltages would then permit operating the sensor in an advantageous manner. The switch or switches that are needed to this end could be controllable analogous switches, which could be directly activatable by the microprocessor or microcomputer by means of a signal. The signal could be a unipolar square-wave signal, and have a very stable frequency.

With respect to a particularly functional layout, the voltages could comprise two unipolar ac voltages and one dc voltage. The amplitude of the ac voltage could be twice the amplitude of the dc voltage. In a particularly advantageous manner, the unipolar ac voltages could be square-wave signals, which are especially easy to generate by the switch or switches. Costly stabilizations of amplitude, frequency, and phase, which are needed in the case of a sine-wave activation, thus become unnecessary.

In a further advantageous manner, the two unipolar ac voltages could be symmetric and complementary to the dc voltage. In this case, the one unipolar ac voltage could be smaller than the dc voltage, and/or the other unipolar ac voltage could be greater than the dc voltage.

The voltages could be applied to the inputs of a sensor driver or the inputs of a plurality of sensor drivers, which could include high-ohmic resistors. When the sensor now has two identical impedances, the potential at the output of the sensor will be equal to the generated dc voltage, i.e. the reference voltage, and the ac voltage component will essentially equal zero. When the impedances change because of the measurement effect, and it turns out that the impedances are unequal, an ac voltage will superpose upon the reference voltage at the output of the sensor.

As regards a particularly advantageous further processing of the measuring signal, the output signal of the sensor could be supplied to a synchronous converter, preferably via a preamplifier. It would then be possible to apply to the output of the synchronous converter a signal, whose amplitude is proportional to the changes of the complex impedances of the sensor, and whose shape is in addition very close to a square waveform. It would then be very simple to demodulate and/or digitize this square-wave signal. The circuit arrangement would then have a very satisfactory signal-noise ratio.

With respect to a very simple form of realization, the synchronous converter could be controllable. In a particularly advantageous manner, the synchronous converter could be directly activatable from the microprocessor or microcomputer.

As regards a particularly satisfactory transmission, the output signal of the synchronous converter could be amplified by means of an amplifier, in particular a programmable amplifier.

A temperature measuring circuit could be used for measuring the ac voltage drop and/or dc voltage drop via the resistors of the sensor driver. With that, it would be possible to measure a signal proportionally to the absolute temperature by means of the ac and/or dc voltage drop.

With respect to a particularly simple layout, the output signal of the synchronous converter and/or the output signal of the temperature measuring circuit could be adapted for being digitized or digitally modulated by means of a multiplexer and/or an A/D converter, preferably by undersampling. In this connection, the multiplexer could be activatable by means of the microprocessor or microcomputer.

Within the scope of further processing the measuring signal, as well as with respect to compensating a temperature, the output signal of the A/D converter could be supplied to the microprocessor or microcomputer.

A compensated distance signal could be computable by the microprocessor or microcomputer by means of the demodulated distance signal, and/or the absolute temperature, and/or the gradient temperature. For further processing, the compensated distance signal could then be adapted for release as an analogous signal, pulse-width modulated signal PWM, by means of a D/A converter, or for further processing by means of a digital interface. The signal would thus be made usable for universal further processing.

The method of the invention could be used in particular for operating a circuit arrangement according to the foregoing description. In the case of this method, it is advantageous that the measuring signal, the absolute temperature, and the gradient temperature of the sensor are simultaneously acquired by means of a microprocessor or microcomputer, and that this permits preventing to the greatest extent possible the temperature-dependent changes of the impedances, and measuring errors connected therewith. In a particularly advantageous manner, it would be possible to compensate at the same time the dependency of the measuring signal on the absolute temperature and the gradient temperature, preferably by means of the microprocessor or microcomputer.

As regards a particularly satisfactory temperature compensation, the microprocessor or microcomputer could compute the difference and the change of the mean value from the signals that are digitized by means of an A/D converter. In this connection, the change of the mean value would be proportional to the gradient temperature. For improving the accuracy of the output signal, it would also be possible to use the digitized signals for averaging.

In a particularly advantageous manner, it would be possible to compute a correction factor $k_2$ by means of the output signal of a temperature measuring circuit, which is proportional to the absolute temperature. The computation of the correction factor $k_2$ could be performed preferably by means of the microprocessor or microcomputer. In addition or as an alternative, a further correction factor $k_1$ could be stored in the microprocessor or microcomputer. In this instance, the correction factor $k_1$ could represent the type of sensor.

By means of an algorithm, the microprocessor or microcomputer could compute an output signal, which is determined by means of the equation $$U_{out}=[(A-B)-(u_{ref}-(A+B)/2)k_1]k_2(T).$$

There now exist various possibilities of improving and further developing the teaching of the present invention in an advantageous manner. To this end, one may refer to the following detailed description of a preferred embodiment of a circuit arrangement and a method in accordance with the invention for activating sensors and evaluating their signals with reference to the drawing. In conjunction with the detailed description of the preferred embodiment of the circuit arrangement and method according to the invention with reference to the drawing, also generally preferred improvements and further developments of the teaching are explained.

DETAILED DESCRIPTION OF THE PREFERRED EMBODIMENTS

Figure 1:
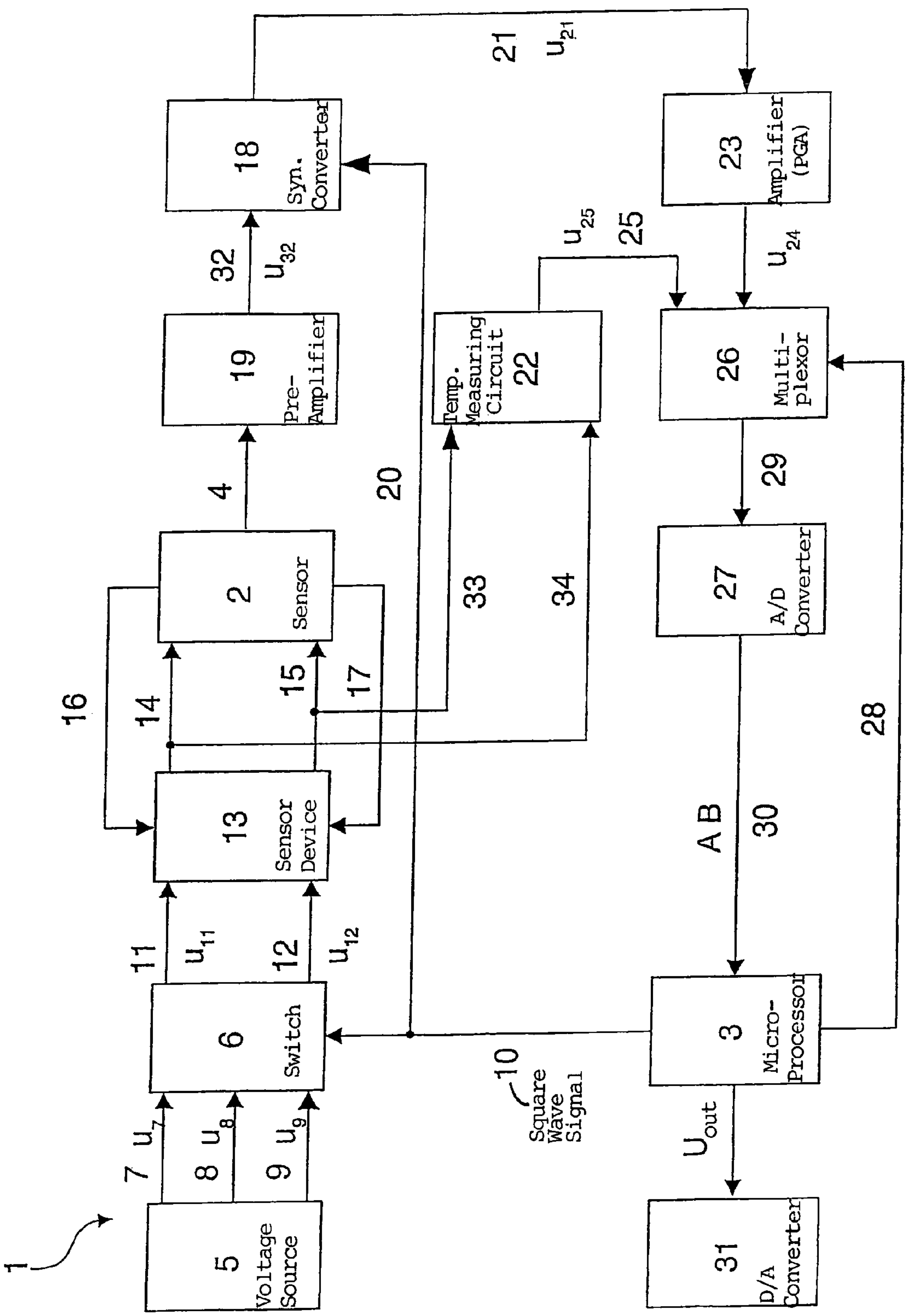
FIG. 1 is a schematic view of an embodiment of a circuit arrangement according to the invention for activating sensors and evaluating their signals.

A circuit arrangement 1 for controlling sensors and evaluating their signals comprises a sensor 2 for acquiring mechanical quantities. In the present embodiment, the sensor 2 is an eddy current sensor.

In accordance with the invention, the measuring signal, the absolute temperature, and the gradient temperature of the sensor 2 can be simultaneously acquired, preferably by a microprocessor 3. In addition, it is possible to compensate at the same time the dependency of the measuring signal on the absolute temperature and the gradient temperature by means of the microprocessor 3.

The sensor 2 comprises two impedances $Z_1$ and $Z_2$. The temperature-dependent changes of the impedances $Z_1$ and $Z_2$ can be measured by means of the complex and the ohmic input resistance of sensor 2. The measuring signal is applied at the output of the sensor 2 to a line 4.

Three voltages $u_7$, $u_8$, and $u_9$ can be generated by means of a source of voltage 5 and a switch 6. The switch 6 is a controllable, analogous switch, which is directly activated by the microprocessor 3 by means of a signal 10.

The signal 10, which the microprocessor 3 uses to activate the analogous switch 6, is a unipolar square-wave signal with a very stable frequency. In the first half period of square-wave signal 10, the source of voltage 5 connects to the inputs of a sensor driver 13, via analogous switch 6 and lines 7, 11, and at the same time via lines 9 and 12. In the second half period of square-wave signal 10, the source of voltage 5 connects to the same inputs of sensor driver 13 via lines 8, 11 and 8, 12. In this instance, the voltages $u_7$ and $u_9$ are unipolar ac voltages, and voltage $u_8$ is a dc voltage. The amplitude of voltages $u_7$ and $u_9$ is twice the amplitude of voltage $u_8$. The two unipolar voltages $u_7$ and $u_9$ are symmetrical and complementary to the voltage $u_8$, with the voltage $u_7$ being greater than the voltage $u_8$, and the voltage $u_9$ smaller than the voltage $u_8$ according to the relation $|u_8-u_7|=|u_8-u_9|$.

The sensor driver 13 comprises high ohmic input resistors for eliminating the temperature drift of analogous switch 6.

Via lines 14, 15, 16, and 17, the sensor driver 13 also activates the sensor 2, whose output signal is the measuring signal. The measuring signal can be supplied to a synchronous converter 18 by means of line 4 via a preamplifier 19.

The synchronous converter 18 is controllable, and directly activated by microprocessor 3 via a line 20. At the output of the synchronous converter 18, a signal $u_{21}$ is applied, whose amplitude is proportional to the changes of the complex impedances $Z_1$, $Z_2$ of sensor 2, and substantially corresponds to a square-wave voltage. The further processing of the output signal $u_{21}$ of synchronous converter 18 occurs by means of an amplifier 23, which is in this instance a programmable amplifier—PGA.

A temperature measuring circuit 22 permits measuring the ac and/or the dc voltage drop via the resistors of sensor driver 13. In this case, the ac or the dc voltage drop is proportional to the absolute temperature.

The output signal $u_{21}$ of synchronous converter 18, or the output signal $u_{24}$ of programmable amplifier 23, and the output signal $u_{25}$ of temperature measuring circuit 22 are further processed by means of a multiplexer 26 and an A/D converter 27. In this connection, the microprocessor 3 activates the multiplexer 26 via a line 28.

The digitized and demodulated measuring signal is supplied to the microprocessor 3 via a line 30 for computing an output signal $u_{out}$. In this connection, it should be noted that a substantially clean square-wave signal is present because of a corresponding preparation of the measuring signal by the synchronous converter. With that, an improved resolution is accomplished, and both the sampling instant and sampling width can be selected substantially freely. The synchronous converter 18 effectively avoids the disadvantages of a sinusoidal oscillator, namely the increased demands on stability in amplitude, frequency, and phase.

By means of the demodulated distance signal, the absolute temperature, and the gradient temperature, the microprocessor 3 computes a compensated distance signal $u_{out}$. The compensated distance signal $u_{out}$ is output as an analogous signal by means of a D/A converter 31.

From the signals A, B that are digitized in A/D converter 27, the microprocessor 3 computes the difference (A−B) and the drift of the average (A+B)/2. In this connection, the drift of the average (A+B)/2 is proportional to the gradient temperature.

The output signal $u_{25}$ of the temperature measuring circuit 22, which has been supplied to the microprocessor 3, and which is proportional to the absolute temperature, is converted into a correction coefficient $k_2$ (T). A further correction factor $k_1$, which represents the type of sensor, and thus makes the circuit universally usable and independent of the type of sensor, is stored in microprocessor 3. The compensated distance signal $u_{out}$ is then computed according to the formula:

$$U_{out}=[(A-B)-(u_8-(A+B)/2)k_1]k_2(T).$$

Figure 2:
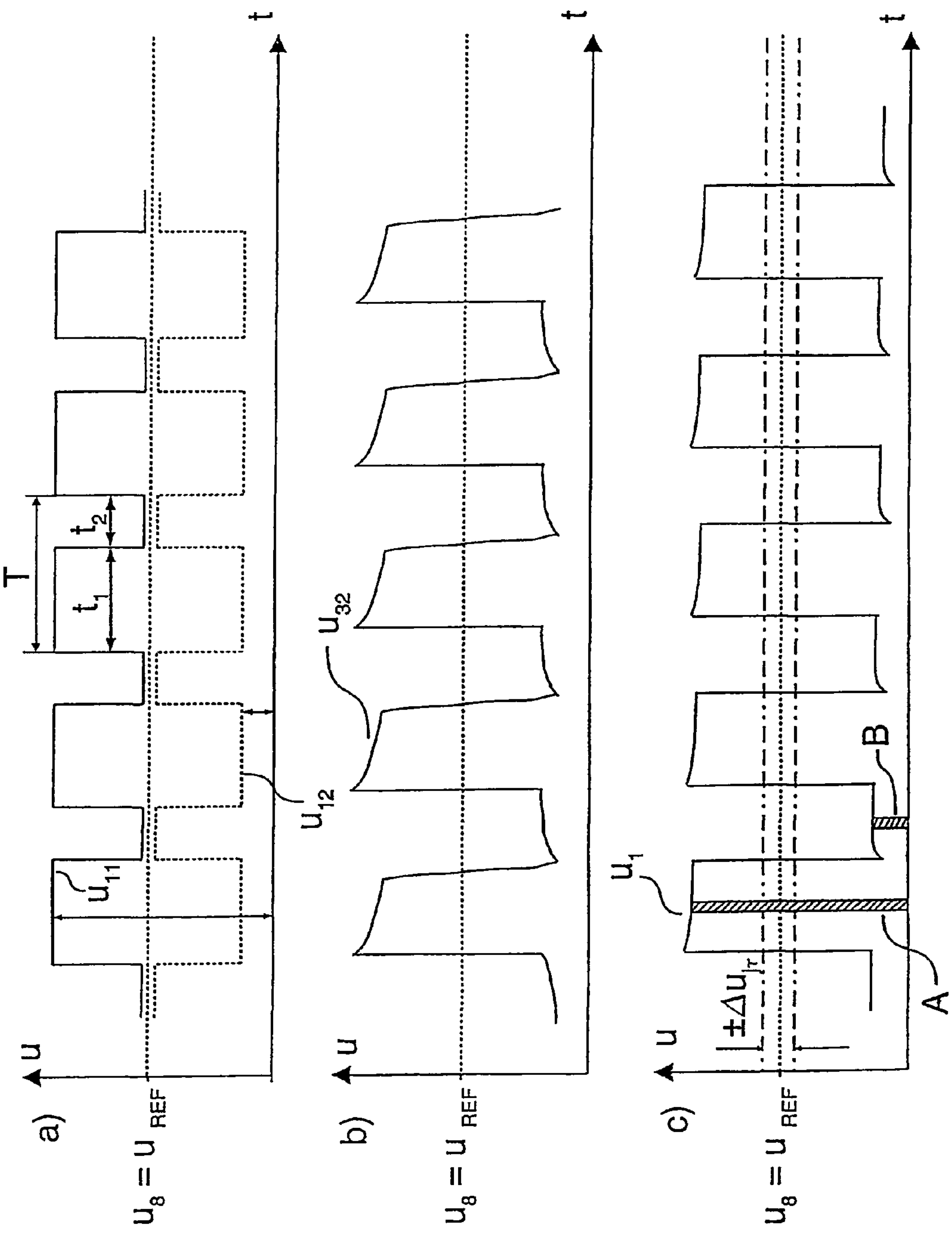
FIG. 2 is a graphic view of a plurality of signals in different points of the circuit arrangement according to the invention.

FIG. 2 is a graphic representation of a plurality of signals in different points of the circuit arrangement. In this representation, FIG. 2*a* shows the two complementary square-wave voltages $u_{11}$ and $u_{12}$, which are symmetric with respect to the dc voltage $u_8$, and which are applied both to the inputs of sensor driver 13 and to the inputs of sensor 2.

FIG. 2*b* shows a typical signal $u_{32}$ at the output of preamplifier 19 or at the input of synchronous converter 18.

Finally, FIG. 2*c* shows the measuring signal $u_{21}$ at the output of synchronous transformer 18. In this connection, it is very clear that the measuring signal is now essentially a square-wave signal.

Figure 3:
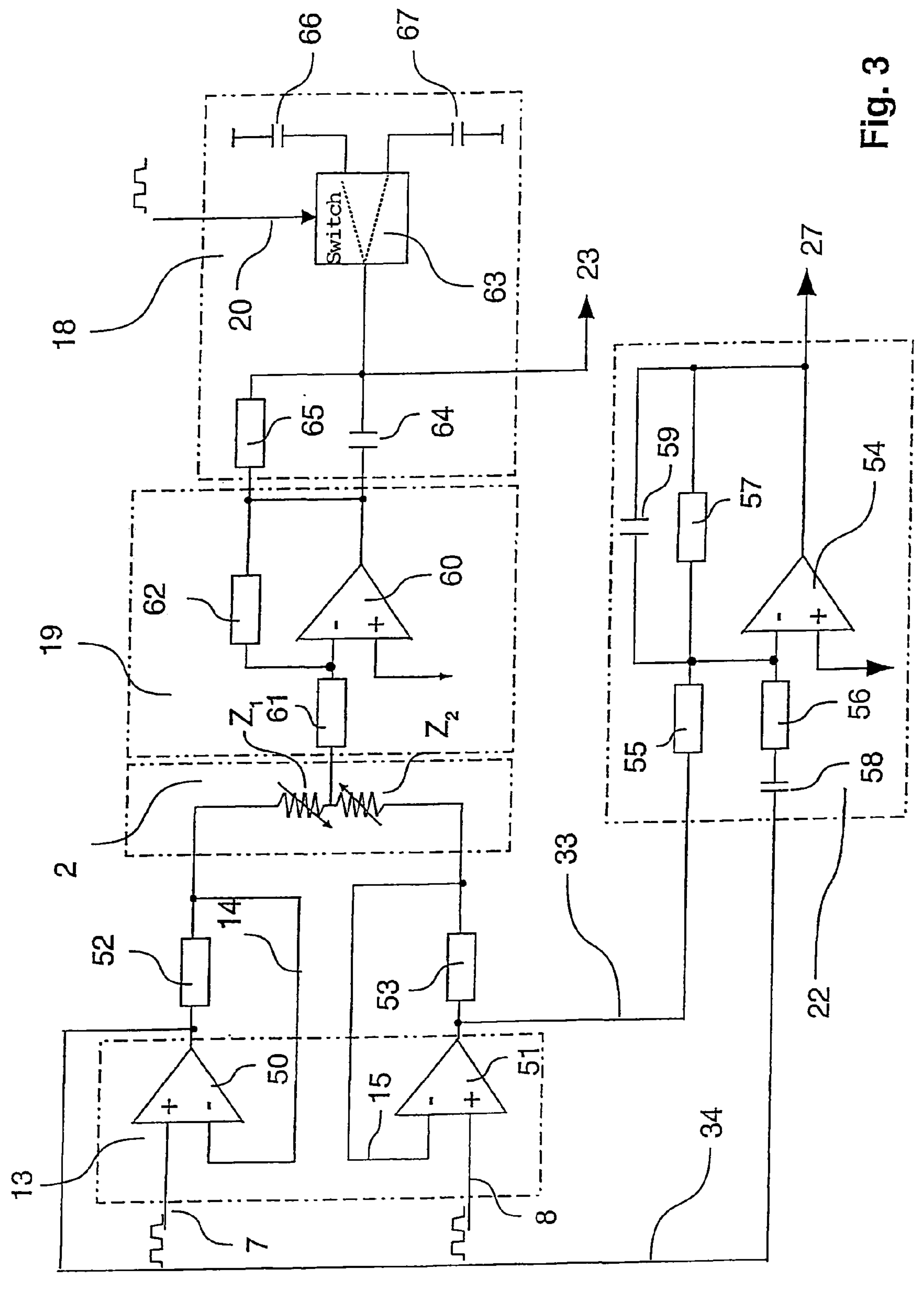
FIG. 3 is a schematic view of a portion of the circuit arrangement according to the invention as shown in FIG. 1.

FIG. 3 illustrates a portion of the circuit arrangement 1. The sensor driver 13 comprises two operational amplifiers 50 and 51, whose inverting inputs connect via lines 14 and 15 to the terminals of sensor 2. The voltage drops on resistors 52 and 53 are here dependent on the input impedance of the sensor 2.

The outputs of operational amplifiers 50 and 51 connect via lines 33 and 34 to the temperature measuring circuit 22. The latter comprises an operational amplifier 54, resistors 55, 56, 57 and capacitors 58 and 59. The output of operational amplifier 51 connects via line 33 and resistor 55 to the inverting input of operational amplifier 54. The output of operational amplifier 50 connects to the inverting input of operational amplifier 54 via a high pass, namely capacitor 58 and resistor 56. This leads to an addition of the signals at the output of the operational amplifiers 50 and 51. Accordingly, at the output of operational amplifier 54 only a dc component proportional to the temperature change is present in a particularly advantageous manner. This kind of temperature measurement occurs very rapidly and without additional low-pass filtration.

There are two variants for measuring the temperature. On the one hand, it is possible to use the dc voltage drop on resistors 52 and 53 for measuring the temperature. On the other hand, it is also possible to use the ac voltage drop on resistors 52 and 53, when the input impedance of the sensor is independent of the position of the object being measured. In this connection, the temperature signal is evaluated in the same way as the measuring signal, for example, in the way of A−B.

The signal at the center tap of sensor 2 is built up via preamplifier 19, and supplied both via an operational amplifier 60 and via resistors 61 and 62 to the controllable synchronous converter 18. As seen in FIG. 3, the components of the synchronous converter 18 may comprise a switch 63 which is controlled by the microprocessor 3 via the line 20, a resistor 65, and capacitors 64, 66, and 67. The values of these structural components are dependent on the carrier frequency, the cycle of microprocessor 3, and the form of the output signal of sensor 2. With different combinations of these structural elements, it is possible to adjust different break frequencies of the synchronous converter 18. The output of synchronous converter 18, line 21, leads to programmable preamplifier 23.

When the microprocessor 3 activates the circuit arrangement 1 via the lines 10, 20, and 28, the sensor 2 will receive complementary unipolar voltages as are shown in FIG. 2*a*. This means that the sensor 2 will be simultaneously supplied with a square-wave voltage and a superposed dc voltage component, with the amplitude of the dc voltage being half of that of the ac voltage.

When the two impedances $Z_1$ and $Z_2$ of the sensor 2 are the same, the potential of line 4 will be equal to dc voltage $u_8$, and the ac voltage component will essentially equal zero. If the impedances $Z_1$ and $Z_2$ change because of the measuring effect, and $Z_1 \neq Z_2$, the dc voltage $u_8$ on line 4 will be superposed by an ac voltage, which shows, because of the complex impedances $Z_1$, $Z_2$, a nonlinear distortion, when the phases of $Z_1$ and $Z_2$ are unequal, and a quadrature component. This limits the dynamics and the resolution of the circuit arrangement 1. A clear improvement of these parameters, for example, with a resolution from factor 10 to factor 100, is achieved with the use of the controllable synchronous converter 18. The output signal thereof has an amplitude, which is proportional to the changes of complex impedances $Z_1$ and $Z_2$, and it has approximately a square waveform, as shown in FIG. 2*c*. This has great advantages from the viewpoint of the measuring technology. Thus, the selection of the sampling point is uncritical, high-frequency disturbances are filtered, and the zero point is simple to adjust via the square-wave amplitude. This makes the circuit arrangement 1 very universally applicable, since it can be used as an electronic evaluation device for all sensors with complex impedances.

As regards further details, the general description is herewith incorporated by reference for purposes of avoiding repetitions.

Finally, it should be expressly remarked that the above-described embodiment is used for explaining only the claimed teaching, without however limiting the invention to the disclosed embodiment.

What is claimed is:

1. A circuit arrangement for activating a sensor and evaluating its signals, comprising at least one sensor for acquiring mechanical data, and a circuit member for simultaneously acquiring a measuring signal, an absolute temperature, and a gradient temperature of the sensor and wherein the at least one sensor comprises a parametric sensor with complex impedances, and wherein the circuit member includes a microprocessor or microcomputer, and wherein the microprocessor or microcomputer is configured to simultaneously compensate the dependency of the measuring signal on the absolute temperature and the gradient temperature.

2. The circuit arrangement of claim 1, wherein the at least one sensor comprises at least one impedance.

3. The circuit arrangement of claim 2, wherein the temperature dependent changes of the impedance are acquired by means of the complex and/or the ohmic input resistance of the sensor.

4. The circuit arrangement of claim 1, wherein at least two voltages are generated by means of a source of voltage and/or at least one switch and are applied to a sensor driver which is connected to said at least one sensor.

5. The circuit arrangement of claim 4, wherein the switch is a controllable analogous switch which is directly activatable from the microprocessor or microcomputer by means of a signal.

6. The circuit arrangement of claim 5, wherein the signal is a unipolar square-wave signal.

7. The circuit arrangement of claim 4, wherein the at least two voltages comprise two unipolar ac voltages and one dc voltage.

8. The circuit arrangement of claim 7, wherein the amplitude of the ac voltages is twice the amplitude of the dc voltage.

9. The circuit arrangement of claim 7, wherein the two unipolar ac voltages are symmetric and/or complementary to the dc voltage.

10. The circuit arrangement of claim 7, wherein one unipolar ac voltage is smaller than the dc voltage and/or the other unipolar ac voltage is greater than the dc voltage.

11. The circuit arrangement of claim 4, wherein the sensor driver comprises high-ohmic input resistors.

12. The circuit arrangement of claim 11, wherein the drop of the ac and/or the dc voltage on the resistors of the sensor driver is measured by means of a temperature measuring circuit.

13. The circuit arrangement of claim 12, wherein a signal proportional to the absolute temperature is measured by means of the ac and/or the dc voltage drop.

14. The circuit arrangement of claim 12, wherein the output signal of the synchronous converter and/or the output signal of the temperature measuring circuit is digitized and/or digitally demodulated by means of a multiplexer and/or an A/D converter.

15. The circuit arrangement of claim 14, wherein the multiplexer is activatable by means of the microprocessor or microcomputer.

16. The circuit arrangement of claim 15, wherein the output signal of the A/D converter is supplied to the microprocessor or microcomputer.

17. The circuit arrangement of claim 14, wherein a compensated distance signal is computed by the microprocessor or microcomputer by means of the demodulated output signal of the synchronous converter and/or the demodulated output signal of the temperature measuring circuit and/or the absolute temperature and/or the gradient temperature.

18. The circuit arrangement of claim 17, wherein the compensated distance signal is output as an analogous signal, a pulse-width modulated signal by means of a D/A converter, or for further processing by means of a digital interface.

19. The circuit arrangement of claim 1, wherein the output signal of the sensor is supplied to a controllable synchronous converter.

20. The circuit arrangement of claim 19, wherein the synchronous converter is directly activated by the microprocessor or microcomputer.

21. The circuit arrangement of claim 20, wherein the output signal of the synchronous converter is amplified by means of a programmable amplifier.

22. A method of activating sensors and evaluating their signals, comprising the steps of operating a circuit arrangement which comprises at least one sensor for acquiring mechanical data, and a circuit member for simultaneously acquiring a measuring signal, an absolute temperature, and a gradient temperature of the sensor, wherein the measuring signal, the absolute temperature, and the gradient temperature of the sensor are simultaneously acquired by means of a microprocessor or microcomputer, and wherein the dependence of the measuring signal on the absolute temperature and the gradient temperature, is simultaneously compensated, by means of the microprocessor or microcomputer.

23. The method of claim 22, wherein the microprocessor or microcomputer computes from signals (A, B) which are digitized by means of an A/D converter, the difference (A−B) and the change of the average (A+B)/2).

24. The method of claim 23, wherein the change of the average ((A+B)/2) is proportional to the gradient temperature.

25. The method of claim 22, wherein a correction factor $k_2$ (T) is computed by means of the output signal of a temperature measuring circuit, with the output signal being proportional to the absolute temperature.

26. The method of claim 25, wherein a second correction factor $k_1$ is stored in the microprocessor or microcomputer, and wherein the second correction factor $k_1$ represents the type of sensor.

27. The method of claim 26, wherein the microprocessor or microcomputer computes an output signal ($u_{out}$) by means of an algorithm which comprises $$u_{out}=[(A-B)-(u_8-(A+B)/2)k_1]k_2(T),$$

and wherein $u_8$ is a dc voltage applied to a sensor driver.

* * * * *